(12) United States Patent
Hana et al.

(10) Patent No.: US 10,000,312 B2
(45) Date of Patent: Jun. 19, 2018

(54) COMBINATION FOOD STORAGE AND SERVING DEVICE

(71) Applicants: David Hana, St. Charles, IL (US); Susan Hana, St. Charles, IL (US)

(72) Inventors: David Hana, St. Charles, IL (US); Susan Hana, St. Charles, IL (US)

( * ) Notice: Subject to any disclaimer, the term of this patent is extended or adjusted under 35 U.S.C. 154(b) by 145 days.

(21) Appl. No.: 15/069,566

(22) Filed: Mar. 14, 2016

(65) Prior Publication Data

US 2017/0259955 A1    Sep. 14, 2017

(51) Int. Cl.
| | |
|---|---|
| *B65D 21/032* | (2006.01) |
| *B65D 21/02* | (2006.01) |
| *A47G 19/03* | (2006.01) |
| *A47J 39/02* | (2006.01) |

(52) U.S. Cl.
CPC ......... *B65D 21/0209* (2013.01); *A47G 19/03* (2013.01); *A47J 39/02* (2013.01)

(58) Field of Classification Search
CPC ................................................. B65D 21/0234
See application file for complete search history.

(56) References Cited

U.S. PATENT DOCUMENTS

| | | | |
|---|---|---|---|
| 2,627,991 A | 2/1953 | Maersch | |
| 3,145,870 A | 8/1964 | Lockwood | |
| 3,552,593 A | 1/1971 | Szopo | |
| 3,938,726 A * | 2/1976 | Holden, Jr. | ............ B65D 11/02 |
| | | | 229/103.11 |
| 4,545,487 A | 10/1985 | Asmus | |
| 5,036,980 A * | 8/1991 | Vigue | ................ B65D 21/0234 |
| | | | 206/515 |
| 5,356,023 A | 10/1994 | Krupa | |
| D552,424 S | 10/2007 | Hayes et al. | |
| 9,326,625 B1 * | 5/2016 | Esfahani | ................ A47G 19/02 |
| 2015/0014329 A1 | 1/2015 | Konopatsky | |

* cited by examiner

*Primary Examiner* — Stephen Castellano

(57) ABSTRACT

A combination food storage and serving device includes a plurality of plates. Each plate comprises a bottom that is substantially flat. A wall is coupled to and extends upwardly from a circumference of the bottom. A rim is coupled to an upper perimeter of the wall and extends outwardly from the wall. A plurality of couplers and a plurality of fasteners are coupled to the rim. The fasteners are complementary to the couplers. A first plate is upside downwardly positionable over a second plate, such that respective couplers positioned on the rim of the first plate are positioned to couple with respective fasteners positioned on the rim of the second plate. The second plate is coupled to the first plate, such that food items place on the second plate are contained within an internal space defined by the first plate and the second plate.

13 Claims, 4 Drawing Sheets

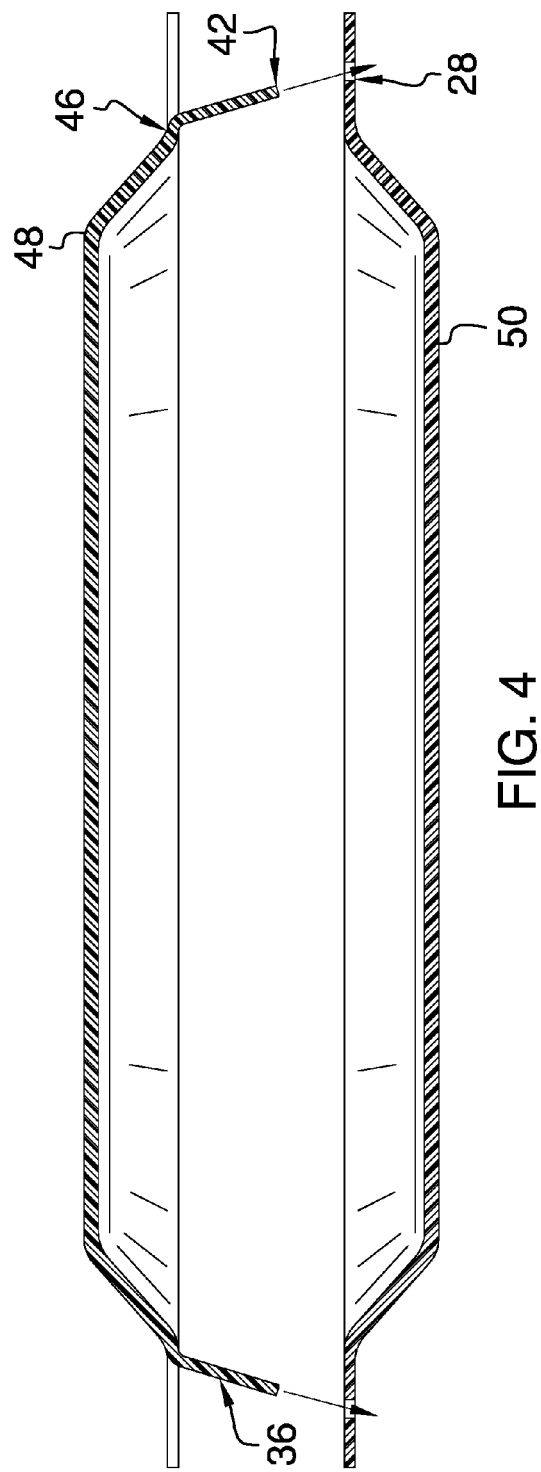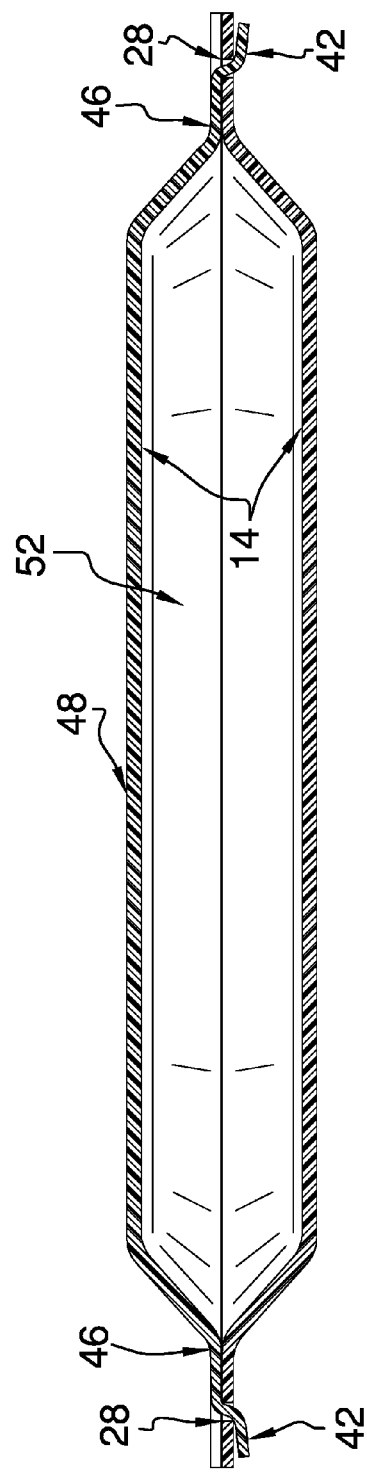

COMBINATION FOOD STORAGE AND SERVING DEVICE

BACKGROUND OF THE DISCLOSURE

Field of the Disclosure

The disclosure relates to food serving devices and more particularly pertains to a new food serving device that also stores food.

SUMMARY OF THE DISCLOSURE

An embodiment of the disclosure meets the needs presented above by generally comprising a plurality of plates. Each plate comprises a bottom that is substantially flat. A wall is coupled to and extends upwardly from a circumference of the bottom. A rim is coupled to an upper perimeter of the wall and extends outwardly from the wall. A plurality of couplers and a plurality of fasteners are coupled to the rim. The fasteners are complementary to the couplers. A first plate is upside downwardly positionable over a second plate, such that respective couplers positioned on the rim of the first plate are positioned to couple with respective fasteners positioned on the rim of the second plate. The second plate is coupled to the first plate, such that food items place on the second plate are contained within an internal space defined by the first plate and the second plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a cross-sectional view of an embodiment of the disclosure.

FIG. 5 is a cross-sectional view of an embodiment of the disclosure.

DESCRIPTION OF THE PREFERRED EMBODIMENT

Figure 1:
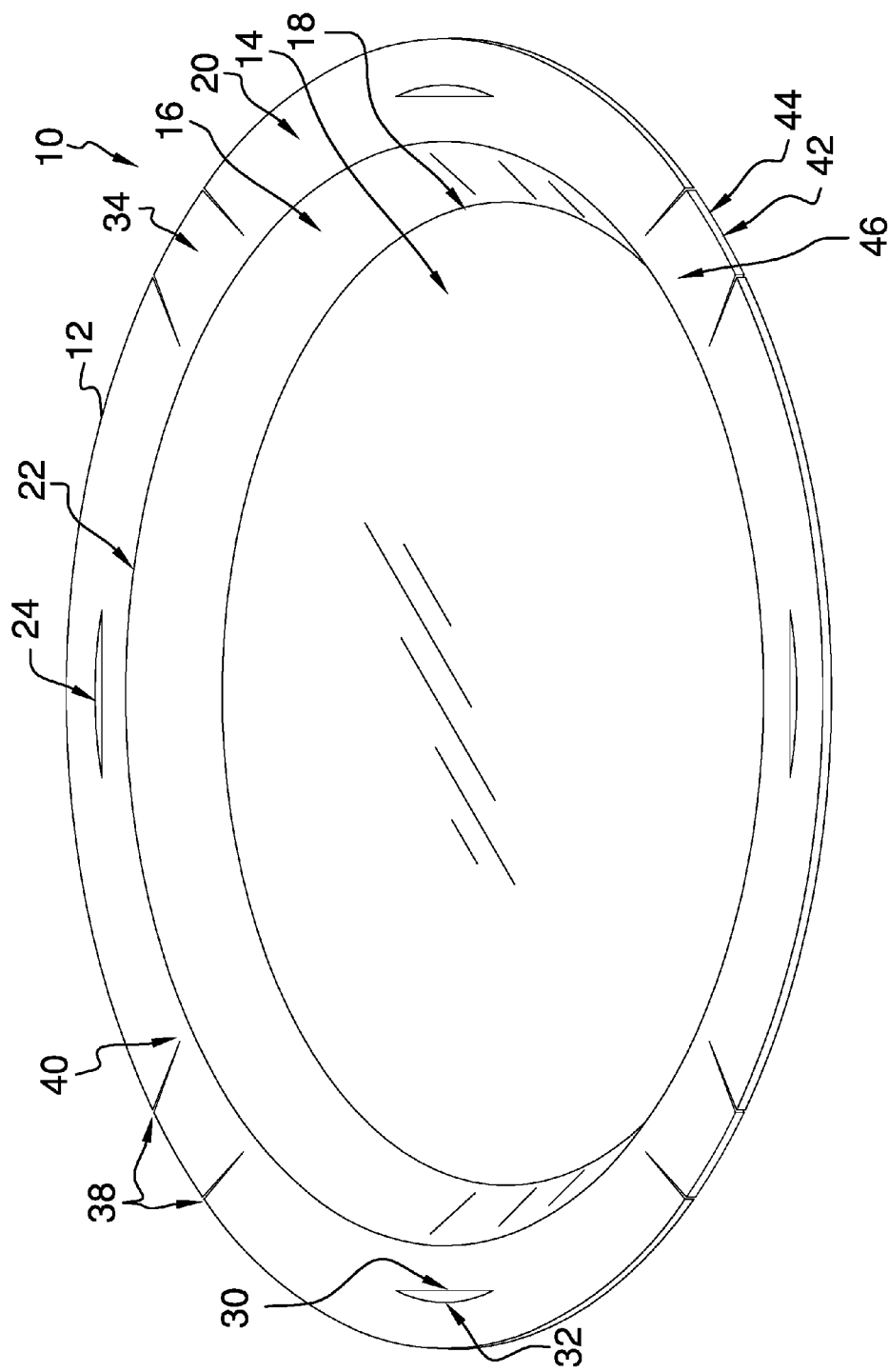
FIG. 1 is an isometric perspective view of a combination food storage and serving device according to an embodiment of the disclosure.
Figure 2:
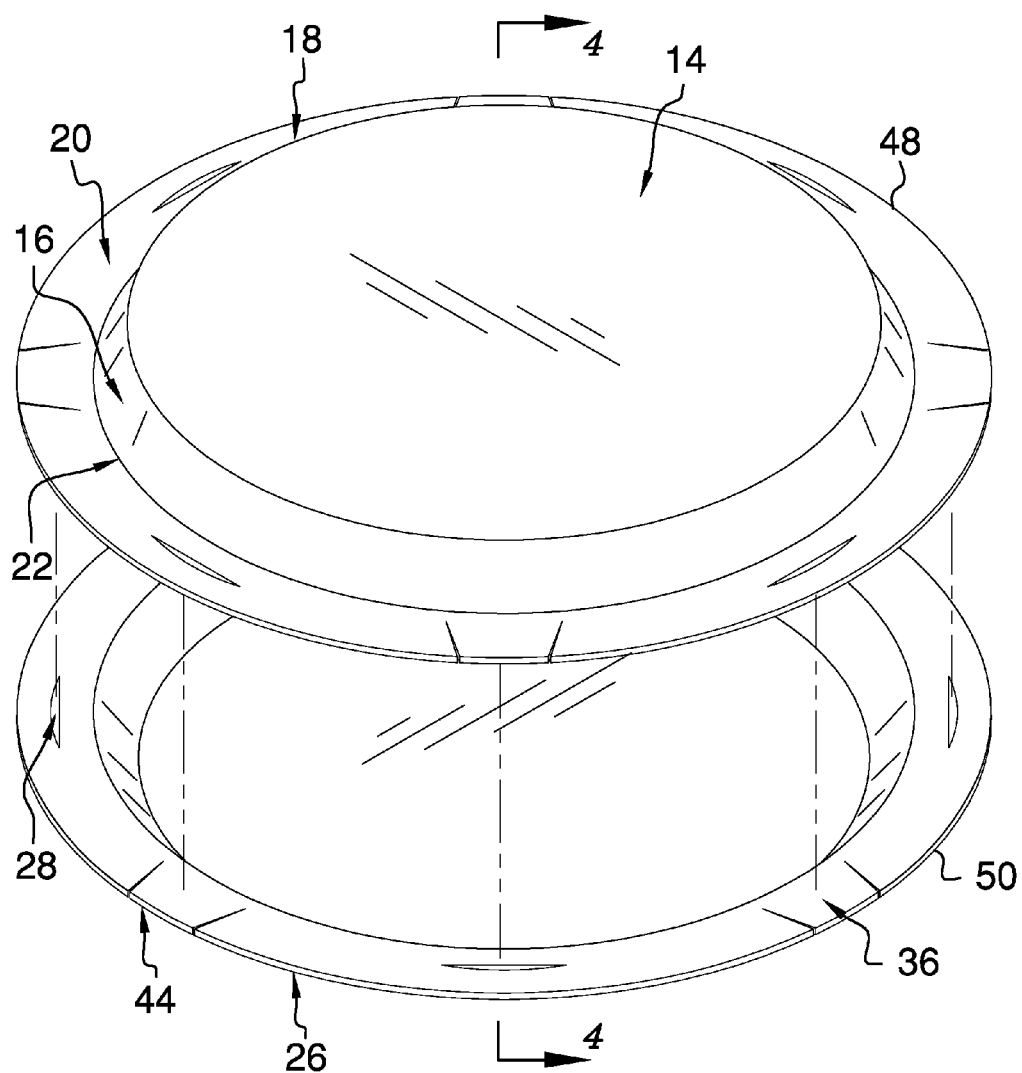
FIG. 2 is a front view of an embodiment of the disclosure.
Figure 3:
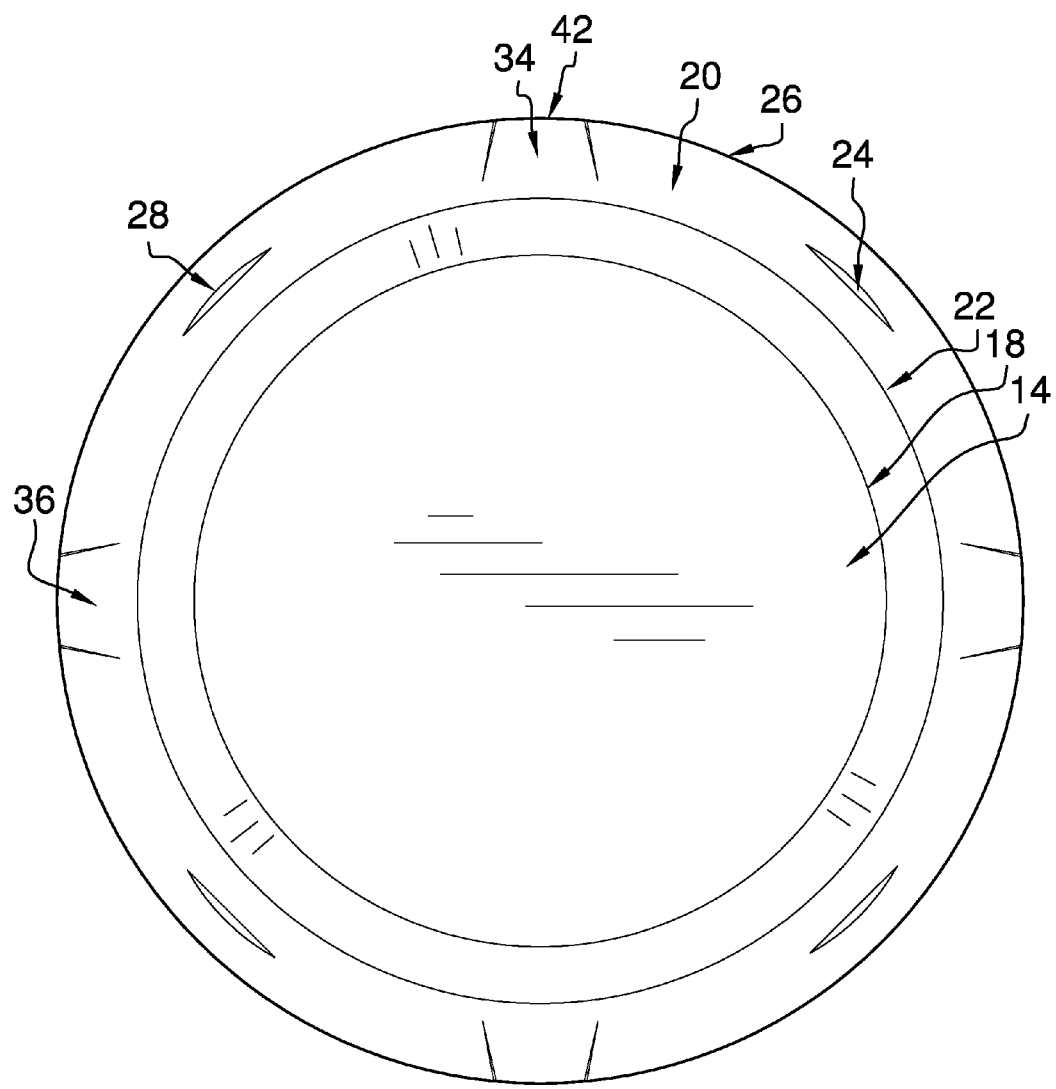
FIG. 3 is a top view of an embodiment of the disclosure.

With reference now to the drawings, and in particular to FIGS. 1 through 5 thereof, a new food serving device embodying the principles and concepts of an embodiment of the disclosure and generally designated by the reference numeral 10 will be described.

As best illustrated in FIGS. 1 through 5, the combination food storage and serving device 10 generally comprises a plurality of plates 12. The plates 12 may be constructed of paper. Each plate 12 comprises a bottom 14 that is substantially flat and, preferably, substantially circular. A wall 16 is coupled to and extends upwardly from a circumference 18 of the bottom 14. A rim 20 is coupled to an upper perimeter 22 of the wall 16 and extends outwardly from the wall 16. Preferably, the rim 20 is substantially flat and substantially parallel to the bottom 14. The upper perimeter 22 is dimensionally larger than the circumference 18 of the bottom 14, such that the wall 16 is angled.

A plurality of couplers 24 is coupled to the rim 20. Each coupler 24 is positioned on the rim 20 substantially equally distant from the upper perimeter 22 of the wall 16 and an outside edge 26 of the rim 20. The couplers 24 are substantially evenly spaced on the rim 20. Preferably, the couplers 24 comprise slots 28. Each slot 28 comprises a first side 30 facing away from the upper perimeter 22 and a second side 32 facing away from the outside edge 26. Preferably, the first side 30 is straight and the second side 32 is arcuate.

The plurality of couplers 24 comprises from two to eight couplers 24. Preferably, the plurality of couplers 24 comprises from four to six couplers 24. More preferably, the plurality of couplers 24 comprises four couplers 24.

A plurality of fasteners 34 is coupled to the rim 20. The fasteners 34 are complementary to the couplers 24. The plurality of fasteners 34 is equivalent in number to the plurality of couplers 24. Each fastener 34 is positioned on the rim 20. The fasteners 34 are substantially evenly spaced on the rim 20.

Preferably, the fasteners 34 comprise tabs 36. Each tab 36 comprises a pair of perforations 38 that are positioned in the rim 20. Each perforation 38 extends from the outside edge 26 to an endpoint 40. The endpoint 40 is positioned proximate to the upper perimeter 22 of the wall 16. The pair of perforations 38 defines a leading edge 42 of the tab 36, which comprises an outside edge section 44. The leading edge 42 is complementary to the slot 28. The endpoints 40 of the pair of perforations 38 define a coupled edge 46 of the tab 36 that extends between the endpoints 40. The pair of perforations 38 is positioned in the rim 20 such that the tab 36 is configured for positioning by the user from a position coplanar with the rim 20 to a position transverse to the rim 20.

In use, a first plate 48 is upside downwardly positionable over a second plate 50. Respective couplers 24, which are positioned on the rim 20 of the first plate 48, are positioned to couple with respective fasteners 34 that are positioned on the rim 20 of the second plate 50. The second plate 50 is coupled to the first plate 48, such that food items place on the second plate 50 are contained within an internal space 52 defined by the first plate 48 and the second plate 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A combination food storage and serving device comprising:
   a plurality of plates, each of said plates comprising:
      a bottom, said bottom being substantially flat,
      a wall coupled to and extending upwardly from a circumference of said bottom,
      a rim coupled to an upper perimeter of said wall and extending outwardly from said wall,
      a plurality of couplers coupled to said rim, each of said couplers being a slot, each said slot having a first side facing away from said upper perimeter and a second side facing away from said outside edge, said first side being straight, said second side being arcuate, said first side being connected to said second side defining a slot edge extending continuously and fully around said slot whereby said slot has tapered ends, and
      a plurality of fasteners coupled to said rim, each of said fasteners being a tab, at least a portion of each said fastener having a width complementary to a length of said first side such that said fasteners are engageable to said couplers by insertion of said fasteners directly into and through said slot in a straight direction such that opposite edges of said fastener are engaged by said tapered ends of said slot; and
   wherein a first said plate is upside downwardly positionable over a second said plate such that respective couplers positioned on said rim of said first said plate are positioned to couple with respective fasteners positioned on said rim of said second said plate, such that said second said plate is coupled to said first said plate, wherein food items place on said second said plate are contained within an internal space defined by said first said plate and said second said plate.

2. The device of claim 1, wherein said bottom is substantially circular.

3. The device of claim 1, wherein said rim is substantially flat.

4. The device of claim 3, wherein said rim is substantially parallel to said bottom.

5. The device of claim 1, wherein said upper perimeter is dimensionally larger than said circumference of said bottom, wherein said wall is angled.

6. The device of claim 1, wherein each said coupler is positioned on said rim substantially equally distant from said upper perimeter of said wall and an outside edge of said rim.

7. The device of claim 6, wherein:
   said fasteners are substantially evenly spaced on said rim;
   said couplers are substantially evenly spaced on said rim; and
   said plurality of fasteners are equivalent in number to said plurality of couplers.

8. The device of claim 7, wherein said plurality of couplers comprises from two to eight couplers.

9. The device of claim 8, wherein said plurality of couplers comprises from four to six couplers.

10. The device of claim 9, wherein said plurality of couplers comprises four couplers.

11. The device of claim 1, wherein:
   each said tab comprises a pair of perforations positioned in said rim, each said perforation extending from said outside edge to an endpoint, said endpoint being positioned proximate to said upper perimeter of said wall, said pair of perforations defining a leading edge of said tab comprising an outside edge section, said leading edge being complementary to said slot, said endpoints of said pair of perforations defining a coupled edge of said tab extending between said endpoints; and
   wherein said pair of perforations is positioned in said rim such that said tab is configured for positioning by the user from a position coplanar with said rim to a position transverse to said rim.

12. The device of claim 1, wherein said plates comprise paper.

13. A combination food storage and serving device comprising:
   a plurality of plates, each said plate comprising:
      a bottom, said bottom being substantially flat, said bottom being substantially circular,
      a wall coupled to and extending upwardly from a circumference of said bottom,
      a rim coupled to an upper perimeter of said wall and extending outwardly from said wall, said rim being substantially flat, said rim being substantially parallel to said bottom, said upper perimeter being dimensionally larger than said circumference of said bottom, wherein said wall is angled,
      a plurality of couplers coupled to said rim, each said coupler being positioned on said rim substantially equally distant from said upper perimeter of said wall and an outside edge of said rim, said couplers being substantially evenly spaced on said rim, said couplers comprising slots, each said slot comprising a first side facing away from said upper perimeter and a second side facing away from said outside edge, said first side being straight, said second side being arcuate, said first side being connected to said second side defining a slot edge extending continuously and fully around said slot, said plurality of couplers comprising from two to eight couplers, said plurality of couplers comprising four couplers, and
      a plurality of fasteners coupled to said rim, each of said fasteners being a tab, at least a portion of each said fastener having a width complementary to a length of said first side such that said fasteners are engageable to said couplers by insertion of said fasteners directly into and through said slot in a straight direction such that opposite edges of said fastener are engaged by said tapered ends of said slot, said plurality of fasteners being equivalent in number to said plurality of couplers, said fasteners being substantially evenly spaced on said rim, each said tab comprising a pair of perforations positioned in said rim, each said perforation extending from said outside edge to an endpoint, said endpoint being positioned proximate to said upper perimeter of said wall, said pair of perforations defining a leading edge of said tab comprising an outside edge section, said endpoints of said pair of perforations defining a coupled edge of said tab extending between said endpoints, wherein said pair of perforations is positioned in said rim such that said tab is configured for positioning by the user from a position coplanar with said rim to a position transverse to said rim;

said plates comprising paper; and wherein a first said plate is upside downwardly positionable over a second said plate such that respective couplers positioned on said rim of said first said plate are positioned to couple with respective fasteners positioned on said rim of said second said plate, such that said second said plate is coupled to said first said plate, wherein food items place on said second said plate are contained within an internal space defined by said first said plate and said second said plate.

\* \* \* \* \*